United States Patent
Chen et al.

(10) Patent No.: US 7,958,555 B1
(45) Date of Patent: Jun. 7, 2011

(54) PROTECTING COMPUTER USERS FROM ONLINE FRAUDS

(75) Inventors: Chih Sheng Chen, Taipei (TW); Shr-An Su, Taipei (KR); Yi-Chan Hung, Taipei (TW)

(73) Assignee: Trend Micro Incorporated, Tokyo (JP)

( * ) Notice: Subject to any disclaimer, the term of this patent is extended or adjusted under 35 U.S.C. 154(b) by 921 days.

(21) Appl. No.: 11/906,022

(22) Filed: Sep. 28, 2007

(51) Int. Cl.
*G06F 11/00* (2006.01)

(52) U.S. Cl. .............................. 726/22; 726/23; 726/25

(58) Field of Classification Search .............. 726/22–23, 726/25
See application file for complete search history.

(56) References Cited

U.S. PATENT DOCUMENTS

| | | | |
|---|---|---|---|
| 7,021,534 B1 | 4/2006 | Kiliccote | |
| 2006/0064374 A1 | 3/2006 | Helsper et al. | |
| 2006/0068755 A1* | 3/2006 | Shraim et al. | 455/410 |
| 2006/0101120 A1 | 5/2006 | Helsper et al. | |
| 2006/0123478 A1 | 6/2006 | Rehfuss et al. | |
| 2006/0168066 A1 | 7/2006 | Helsper et al. | |
| 2007/0073630 A1 | 3/2007 | Greene et al. | |
| 2007/0094500 A1 | 4/2007 | Shannon et al. | |
| 2007/0094727 A1 | 4/2007 | Singh | |
| 2007/0118528 A1 | 5/2007 | Choi et al. | |
| 2007/0124582 A1 | 5/2007 | Shannon et al. | |
| 2007/0136806 A1 | 6/2007 | Berman | |
| 2007/0143845 A1 | 6/2007 | Jeong et al. | |
| 2007/0150743 A1 | 6/2007 | Weatherford et al. | |
| 2007/0174630 A1 | 7/2007 | Shanon et al. | |
| 2007/0192855 A1 | 8/2007 | Hulten et al. | |
| 2008/0028444 A1* | 1/2008 | Loesch et al. | 726/4 |
| 2008/0082662 A1* | 4/2008 | Dandliker et al. | 709/225 |
| 2008/0104182 A1* | 5/2008 | Jimmei | 709/206 |
| 2008/0172741 A1* | 7/2008 | Reumann et al. | 726/23 |

OTHER PUBLICATIONS

"Regular Expression" from Wikipedia, the free encyclopedia, pp. 1-11, [retrieved on Aug. 25, 2007]. Retrieved from the internet: <URL: http://en.wikipedia.org/wiki/Regular_expression>.
"Phishing" from Wikipedia, the free encyclopedia, pp. 1-11, [retrieved on Aug. 24, 2007]. Retrieved from the internet: <URL: http://en.wikipedia.org/wiki/Phishing>.
"Pharming" from Wikipedia, the free encyclopedia, pp. 1-4, [retrieved on Aug. 24, 2007]. Retrieved from the internet: <URL: http://en.wikipedia.org/wiki/Pharming>.
"MD5" from Wikipedia, the free encyclopedia, pp. 1-6, [retrieved on Aug. 24, 2007]. Retrieved from the internet: <URL: http://en.wikipedia.org/wiki/MD5>.
"SHA Hash Functions" from Wikipedia, the free encyclopedia, pp. 1-13, [retrieved on Aug. 25, 2007]. Retrieved from the internet: <URL: http://en.wikipedia.org/wiki/SHA-1>.

* cited by examiner

*Primary Examiner* — Peter Poltorak
(74) *Attorney, Agent, or Firm* — Okamoto & Benedicto LLP (57) ABSTRACT

Protecting computer users from online frauds, such as phishing and pharming. A client computer may include a page signature extractor and a policy enforcer. The page signature extractor may encode a web page to generate its signature, which may be provided to a remote server computer for comparison with signatures of phishing pages. The client computer and the server computer may communicate using the DNS protocol. The policy enforcer may perform one or more predetermined actions when a match is found. Examples of such actions include replacing the web page with a blocking page, displaying a warning message, or both. The policy enforcer may be configured to determine if the web page is part of a phishing or pharming attack by comparing the URL of the web page to URLs of legitimate web pages.

11 Claims, 13 Drawing Sheets

session-48024158.nationalcity.com.dllet.bz/corporate/onlineservices/TreasuryMgmt/
session-8375979.nationalcity.com.dllet.bz/corporate/onlineservices/TreasuryMgmt/
session-23259931.nationalcity.com.dllet.bz/corporate/onlineservices/TreasuryMgmt/
session-1218986.nationalcity.com.dllet.bz/corporate/onlineservices/TreasuryMgmt/
session-9663294.nationalcity.com.dllet.bz/corporate/onlineservices/TreasuryMgmt/
session-0686888.nationalcity.com.dllet.bz/corporate/onlineservices/TreasuryMgmt/
session-2338585.nationalcity.com.dllet.bz/corporate/onlineservices/TreasuryMgmt/
session-0695819.nationalcity.com.dllet.bz/corporate/onlineservices/TreasuryMgmt/
session-91454440.nationalcity.com.dllet.bz/corporate/onlineservices/TreasuryMgmt/
session-82656174.nationalcity.com.dllet.bz/corporate/onlineservices/TreasuryMgmt/
session-899050246.nationalcity.com.dllet.bz/corporate/onlineservices/TreasuryMgmt/
session-449596007.nationalcity.com.dllet.bz/corporate/onlineservices/TreasuryMgmt/
session-729498584.nationalcity.com.dllet.bz/corporate/onlineservices/TreasuryMgmt/
session-68860238.nationalcity.com.dllet.bz/corporate/onlineservices/TreasuryMgmt/
session-3612144142.nationalcity.com.dllet.bz/corporate/onlineservices/TreasuryMgmt/
session-4060634250.nationalcity.com.dllet.bz/corporate/onlineservices/TreasuryMgmt/
session-266972223.nationalcity.com.dllet.bz/corporate/onlineservices/TreasuryMgmt/
session-96594811.nationalcity.com.dllet.bz/corporate/onlineservices/TreasuryMgmt/
session-4631861428.nationalcity.com.dllet.bz/corporate/onlineservices/TreasuryMgmt/

```
1  # Trend Micro Web Threat Prevention — Legitimate URL List
2  # Modified Date: 2007/7/18
3  # [What's New]
4  # 1. Add ebay_leg_008 for confirmed legitimate site of ebay.
5  # 2. Add palpal_leg_006 for confirmed legitimate site of Paypal.
6  # 3. Retire ebay_leg_007 for expired legitimate site of ebay.
7
8  [Legitimate_URL]
9  Pattern=ebay_leg_001   URL_DOMAIN 0.0 1 0 0 0 3  ^(.+\.)*ebay\.com$
10
11 Pattern=ebay_leg_002   URL_DOMAIN 0.0 1 0 0 0 3  ^(.+\.)*ebay\.com\.au$
12
13 Pattern=ebay_leg_003   URL_DOMAIN 0.0 1 0 0 0 3  ^(.+\.)*ebay\.at$
14
15 Pattern=ebay_leg_004   URL_DOMAIN 0.0 1 0 0 0 3  ^(.+\.)*ebay\.be$
16
17 Pattern=ebay_leg_005   URL_DOMAIN 0.0 1 0 0 0 3  ^(.+\.)*ebay\.it$
18
19 Pattern=ebay_leg_006   URL_DOMAIN 0.0 1 0 0 0 3  ^(.+\.)*ebay\.ca$
20
21 Pattern=ebay_leg_008   URL_DOMAIN 0.0 1 0 0 0 3  ^(.+\.)*ebay\.com\.cn$
22
23 Pattern=paypal_leg_001 URL_DOMAIN 0.0 1 0 0 0 3  ^(.+\.)*paypal\.com\.au$
24
25 Pattern=paypal_leg_002 URL_DOMAIN 0.0 1 0 0 0 3  ^(.+\.)*paypal\.at$
26
27 Pattern=paypal_leg_003 URL_DOMAIN 0.0 1 0 0 0 3  ^(.+\.)*paypal\.be$
```

| Phishing URL | URL Signature (MD5) | Page Content Signature (MD5) |
|---|---|---|
| session-48024158.nationalcity.com.dllet.bz/ | 03C057B08EA302CC0F27D0BFA43D74D2 | B4484686B9C6B5F2A8611A27A2CC80C7 |

| Pharming URL | URL Signature (MD5) | Page Content Signature (MD5) |
|---|---|---|
| www..nationalcity.com/ConsultNC/Default.z | DD546A4892EB3FD95EEC3CDB26930DB6 | B4484686B9C6B5F2A8611A27A2CC80C7 |

FIG. 14

| Phishing URL | URL Signature (MD5) | Page Content Signature (MD5) |
|---|---|---|
| session-48024158.nationalcity.com.dllet.bz/c | 03C057B08EA302CC0F27D0BFA43D74D2 | B4484686B9C6B5F2A8611A27A2CC80C7 |
| session-83759794.nationalcity.com.dllet.bz/co | 64254262D530A6ECD562722E6D66FD9F | B4484686B9C6B5F2A8611A27A2CC80C7 |
| session-23259931.nationalcity.com.dllet.bz/c | 0EB8291FCD05EC70B13B8E0ED028CC91 | B4484686B9C6B5F2A8611A27A2CC80C7 |
| session-12189B6.nationalcity.com.dllet.bz/co | 42A2B6FD0D2FF4935711BD985CDABB45 | B4484686B9C6B5F2A8611A27A2CC80C7 |
| session-9663294.nationalcity.com.dllet.bz/co | CF0611BAC7895142C231428OA4F55B6E | B4484686B9C6B5F2A8611A27A2CC80C7 |
| session-0686888.nationalcity.com.dllet.bz/co | BED492256172243503S5EFC2F7228D59B | B4484686B9C6B5F2A8611A27A2CC80C7 |
| session-2338585.nationalcity.com.dllet.bz/co | B60D70C140D86817CA58911FBC2FB6C7 | B4484686B9C6B5F2A8611A27A2CC80C7 |
| session-0695819.nationalcity.com.dllet.bz/co | 2964A3B54F7127D2214A51155BA2A13E | B4484686B9C6B5F2A8611A27A2CC80C7 |
| session-91454440.nationalcity.com.dllet.bz/c | DD546A4892EB3FD95EEC3CDB26930DB6 | B4484686B9C6B5F2A8611A27A2CC80C7 |
| session-82656174.nationalcity.com.dllet.bz/c | 25DADEC66B293E8BF2DBE78E9D661722 | B4484686B9C6B5F2A8611A27A2CC80C7 |
| session-899050246.nationalcity.com.dllet.bz | 1ACBC6F30F48BF36C9D41B5BBB1E17F0 | B4484686B9C6B5F2A8611A27A2CC80C7 |
| session-449596007.nationalcity.com.dllet.bz/ | 33D0C75F8FE1E68656FB81A5A773D9C3 | B4484686B9C6B5F2A8611A27A2CC80C7 |
| session-729498584.nationalcity.com.dllet.bz/ | 855E5E5D08F9J6E6CE7C59D753E1D6718 | B4484686B9C6B5F2A8611A27A2CC80C7 |
| session-68860238.nationalcity.com.dllet.bz/c | F61A92AD0E9FF43200142A360BE68E8E | B4484686B9C6B5F2A8611A27A2CC80C7 |
| session-3612144142.nationalcity.com.dllet.bz | BA945304750DC59A5FB09E7393B29BC1D | B4484686B9C6B5F2A8611A27A2CC80C7 |
| session-406063425O.nationalcity.com.dllet.bz/ | 5A360141604A4AFFE085D25A6B7F5A02 | B4484686B9C6B5F2A8611A27A2CC80C7 |
| session-266972223.nationalcity.com.dllet.bz/ | 04B7591BC2BEF5C2F355BC91072E72F7 | B4484686B9C6B5F2A8611A27A2CC80C7 |
| session-96594811.nationalcity.com.dllet.bz/ca | 1601D40B77201CFA39CC550F9D626B0 | B4484686B9C6B5F2A8611A27A2CC80C7 |

PROTECTING COMPUTER USERS FROM ONLINE FRAUDS

BACKGROUND OF THE INVENTION

1. Field of the Invention

The present invention relates generally to computer security, and more particularly but not exclusively to methods and apparatus for protecting computer users from online frauds.

2. Description of the Background Art

Phishing is a kind of social engineering that involves some form of misrepresentation to obtain confidential information from online computer users. Phishing is not only fraudulent, but is a criminal activity as well. Phishing is a rapidly spreading and dangerous "web threat" on the Internet.

In a typical phishing attack, the perpetrator (also referred to as "attacker" or "fraudster") masquerades as a trustworthy entity in an electronic communication. A phishing attack usually starts with an e-mail falsely claiming to be from the victim's trusted online site. The e-mail is designed to look convincingly real, oftentimes complete with the look and feel of e-mails from the trusted online site. The e-mail includes a link to the attacker's website, which is also referred to as "phishing site." The phishing site serves a web page, referred to as a "phishing page," where the victim enters confidential information thinking he is providing the information to his trusted online site. The phishing page, like the e-mail linking to it, is made to look authentic.

Figure 1:
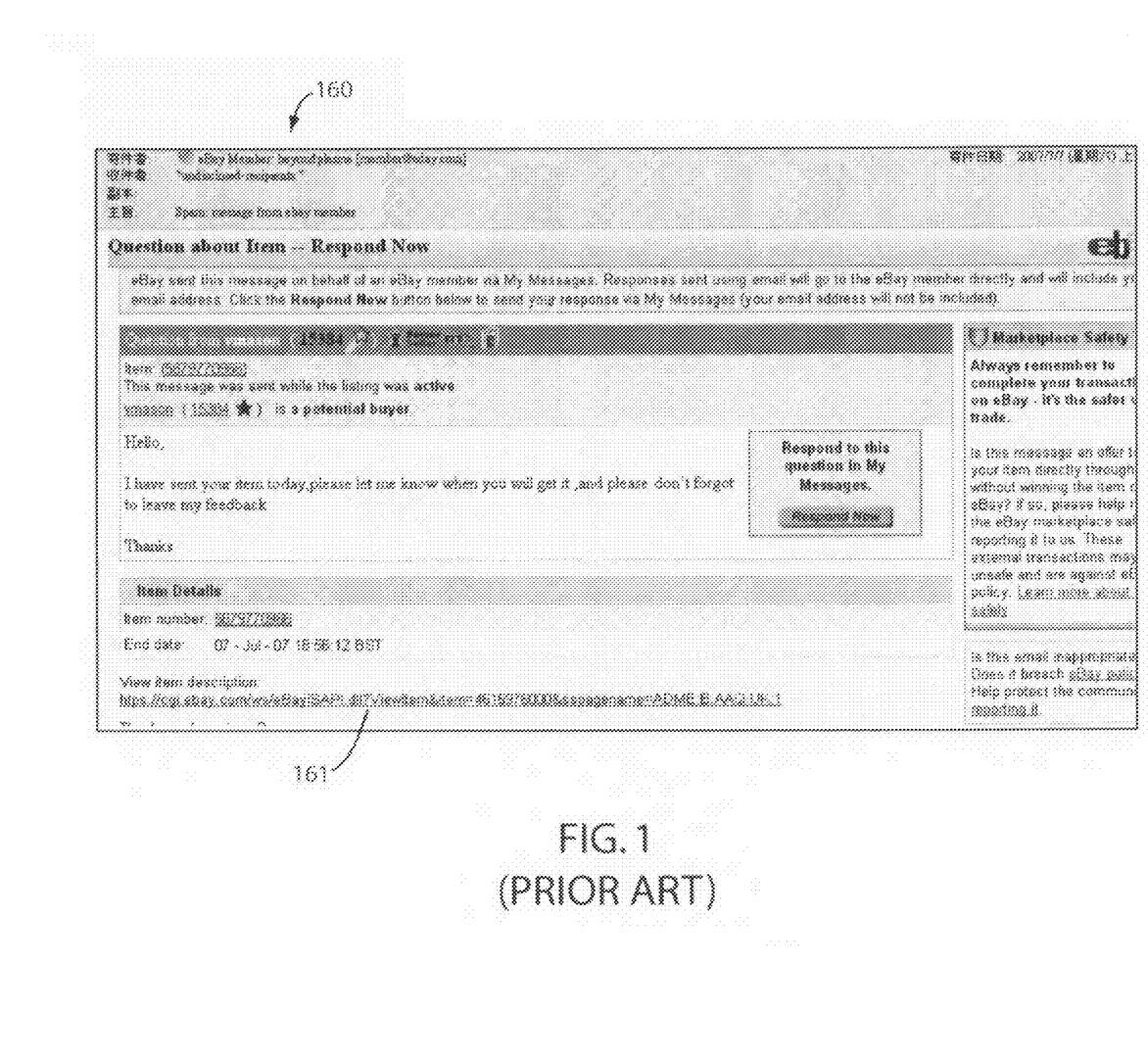
FIG. 1 shows an example e-mail employed in a phishing attack.
Figure 2:
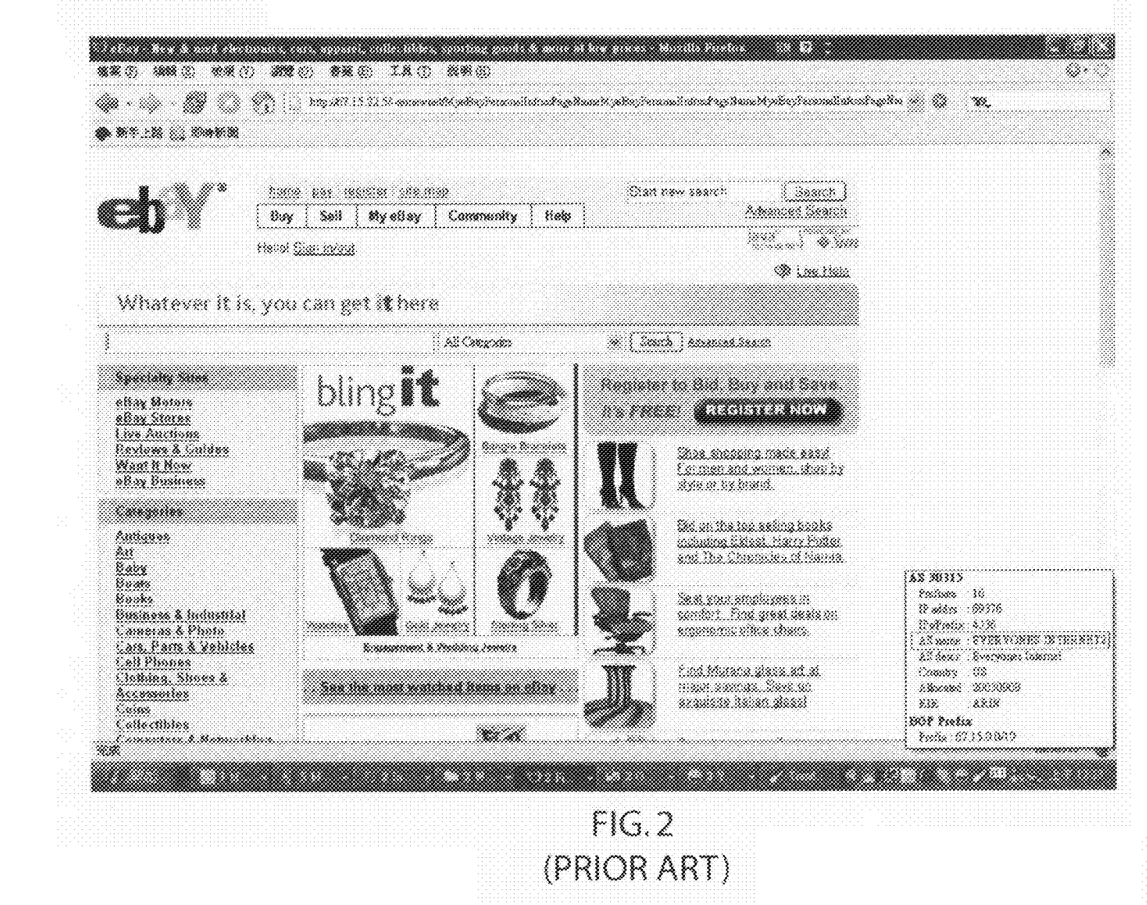
FIG. 2 shows an example phishing page from a phishing site.
Figure 3:
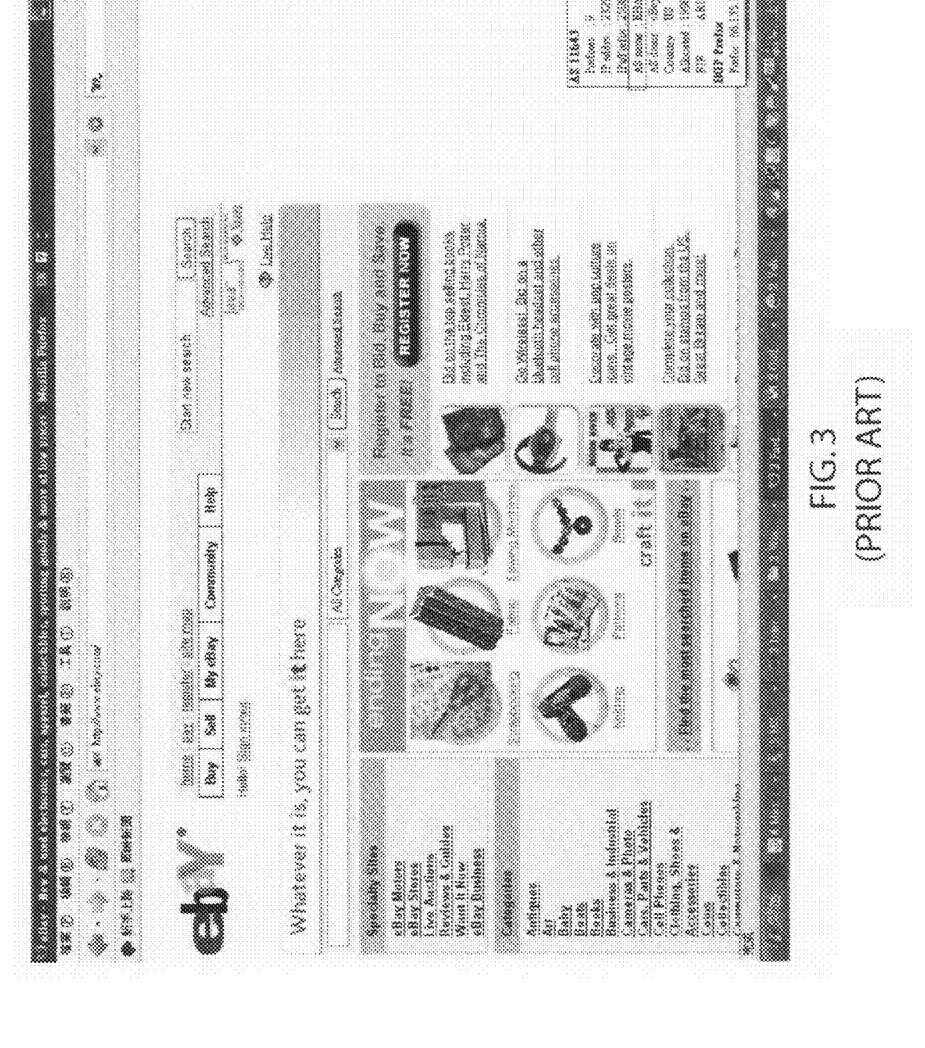
FIG. 3 shows an example web page from a legitimate website.

FIG. 1 shows an example e-mail 160 employed in a phishing attack. In the example of FIG. 1, the e-mail 160 convincingly looks like an e-mail from the eBay® online auction site. However, the e-mail 160 includes a hyperlink 161 that when activated directs the user to a phishing site, rather than the eBay® site. FIG. 2 shows an example web page from the phishing site, while FIG. 3 shows an example web page from the eBay® site. Note the similarity between the phishing site (FIG. 2) and the authentic site (FIG. 3). It is thus not surprising that some users have difficulty distinguish between phishing and authentic sites, causing these users to provide confidential information, such as credit card information, passwords, banking information, personal information, and the like, to the phishing site.

Anti-phishing techniques have been developed to combat phishing attacks. One way of combating phishing is to create and maintain a database of URLs (uniform resource locators) of phishing sites. The database serves as a blacklist that may be consulted to alert users if they visit a potentially dangerous website. Attackers responded to URL look-up or URL-level pattern matching solutions by changing the URLs of phishing sites. For example, so-called "Rock Phishing" is a phishing toolkit for perpetrating phishing attacks. Similar to virus-making kits available in the past, Rock Phishing allows even non-technical individuals to carry out phishing attacks, making phishing more prevalent. Rock Phishing allows a single website with multiple DNS (domain name system) names to host a variety of phishing web pages, which may mimic those of legitimate websites. What is dangerous about Rock Phishing is that the URL of the phishing site can be changed dynamically by creating different middle domain names. FIG. 4 shows examples of dynamically created URLs for a phishing site. Using a URL-level pattern matching approach to detect Rock Phishing would thus be relatively difficult due to the large number of dynamically changing URLs.

A related serious web threat is pharming. Pharming involves redirection of a legitimate website's traffic to a fake website, such as a phishing site. Pharming attacks may be perpetrated using well known DNS cache poisoning, domain name spoofing, and domain name hijacking techniques. In a pharming attack, the user enters the correct URL of a legitimate website in his web browser but still gets redirected to a phishing site. That is, pharming involves phishing pages with legitimate URLs. Pharming therefore does not require emails with false links to point a user to a phishing site.

Figure 5:
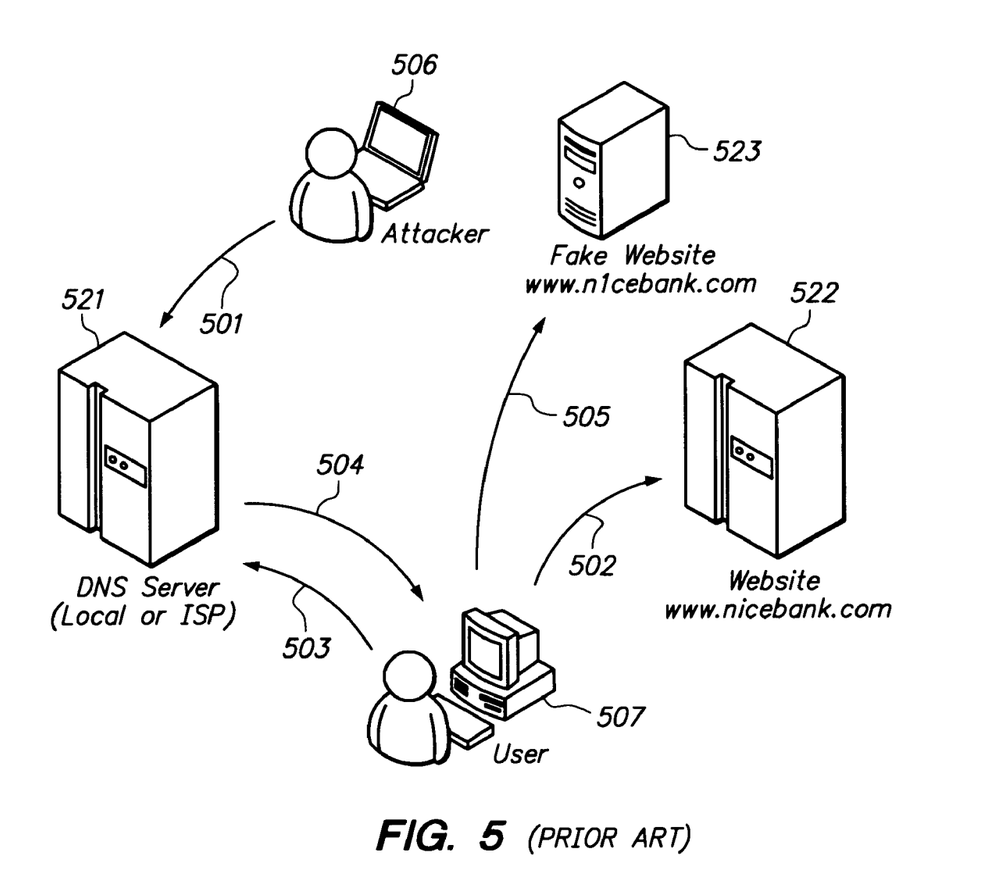
FIG. 5 shows a flow diagram schematically illustrating how pharming is typically perpetrated.

FIG. 5 shows a flow diagram schematically illustrating how pharming is typically perpetrated. In the example of FIG. 5, an attacker using a computer 506 hacks into the DNS server 521 (arrow 501) to change the IP (Internet Protocol) address of "www.nicebank.com" of the legitimate website 522 to the IP address of "www.n1cebank.com" of the phishing site 523. The phishing site 523 hosts web pages that fake those of the website 522. When the user tries to access the website 522 (arrow 502) by correctly entering "www.nicebank.com" in his browser, the computer 507 consults the DNS server 521 (arrow 503) for the IP address associated with "www.nicebank.com." However, because of the earlier hacking, the DNS server 521 provides the computer 507 (arrow 504) the IP address of the phishing site 523 instead of the website 522. This results in the browser of the user being directed to the phishing site 523 (arrow 505). Thinking the phishing site 523 is the website 522, the user enters his confidential information in the phishing site 523.

There are many problems with conventional URL matching approaches in combating phishing and pharming attacks. Firstly, conventional URL matching is ineffective against pharming because the URL that directs the user to the phishing site is going to be a legitimate URL, albeit resolved to the IP address of a phishing site because of a compromised DNS server. Secondly, it is relatively difficult to keep track of dynamically created and changing phishing site URLs used in Rock Phishing attacks. Thirdly, there is no efficient way of collecting the URLs of all phishing sites—there are literally thousands of phishing sites and their number keeps on increasing. Fourthly, conventional URL matching can result in over-blocking, i.e., blocking websites that are not phishing sites. Because phishing sites may be hosted in legitimate websites, a URL of a legitimate website may be included in a block list even after the phishing site has been moved.

What is needed is an effective technique for protecting computer users from online frauds, such as phishing and pharming.

SUMMARY

In one embodiment, a client computer includes a page signature extractor and a policy enforcer. The page signature extractor may encode a web page to generate its signature, which may be provided to a remote server computer for comparison with signatures of phishing pages. The client computer and the server computer may communicate using the DNS protocol. The policy enforcer may perform one or more predetermined actions when a match is found. Examples of such actions include replacing the web page with a blocking page, displaying a warning message, or both. The policy enforcer may be configured to determine if the web page is part of a phishing or pharming attack by comparing the URL of the web page to URLs of legitimate web pages.

These and other features of the present invention will be readily apparent to persons of ordinary skill in the art upon reading the entirety of this disclosure, which includes the accompanying drawings and claims.

DESCRIPTION OF THE DRAWINGS

FIG. 4 shows examples of dynamically created URLs for a phishing site.

FIGS. 13 and 14 illustrate the effectiveness of page signature detection compared to URL-level pattern matching in detecting phishing pages.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Being computer-related, it can be appreciated that some components disclosed herein may be implemented in hardware, software, or a combination of hardware and software (e.g., firmware). Software components may be in the form of computer-readable program code stored in a computer-readable storage medium, such as memory, mass storage device, or removable storage device. For example, a computer-readable storage medium may comprise computer-readable program code for performing the function of a particular component. Likewise, computer memory may be configured to include one or more components, which may be executed by a processor. Software components may be implemented in logic circuits, for example. Components may be implemented separately in multiple modules or together in a single module.

Figure 6:
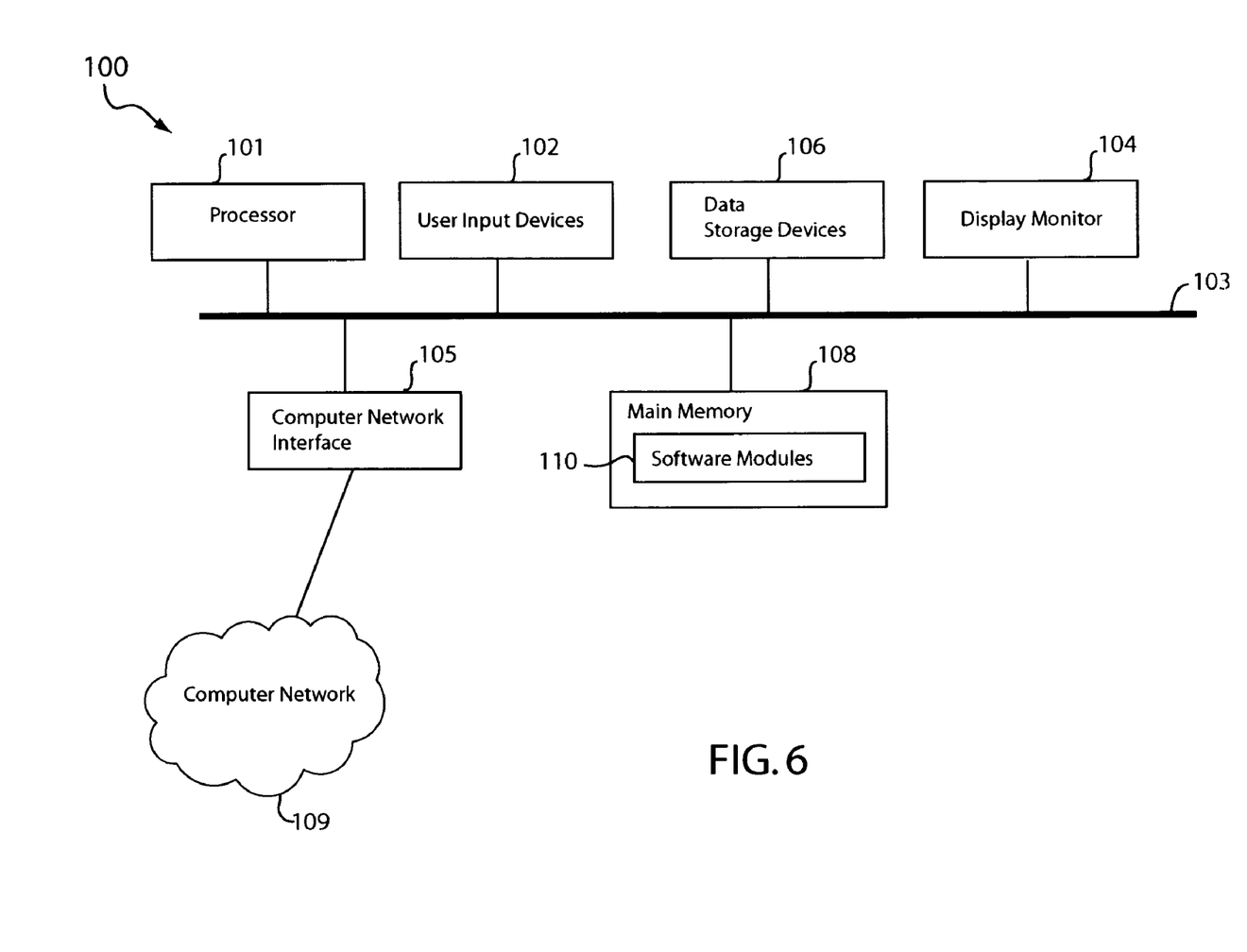
FIG. 6 shows a schematic diagram of a computer in accordance with an embodiment of the present invention.

Referring now to FIG. 6, there is shown a schematic diagram of a computer 100 in accordance with an embodiment of the present invention. The computer 100 may be employed as a client computer 701 (see FIG. 7) or signature server computer 705 (see FIG. 7), for example. The computer 100 may have less or more components to meet the needs of a particular application. The computer 100 may include a processor 101, such as those from the Intel Corporation or Advanced Micro Devices, for example. The computer 100 may have one or more buses 103 coupling its various components. The computer 100 may include one or more user input devices 102 (e.g., keyboard, mouse), one or more data storage devices 106 (e.g., hard drive, optical disk, USB memory), a display monitor 104 (e.g., LCD, flat panel monitor, CRT), a computer network interface 105 (e.g., network adapter, modem), and a main memory 108 (e.g., RAM).

In the example of FIG. 6, the main memory 108 includes software modules 110, which may comprise software components of a client computer 701 or signature server computer 705. The software modules 110 may be loaded from the data storage device 106 to the main memory 108 for execution by the processor 101. The computer network interface 105 may be coupled to a computer network 109, which in this example includes the Internet.

Figure 7:
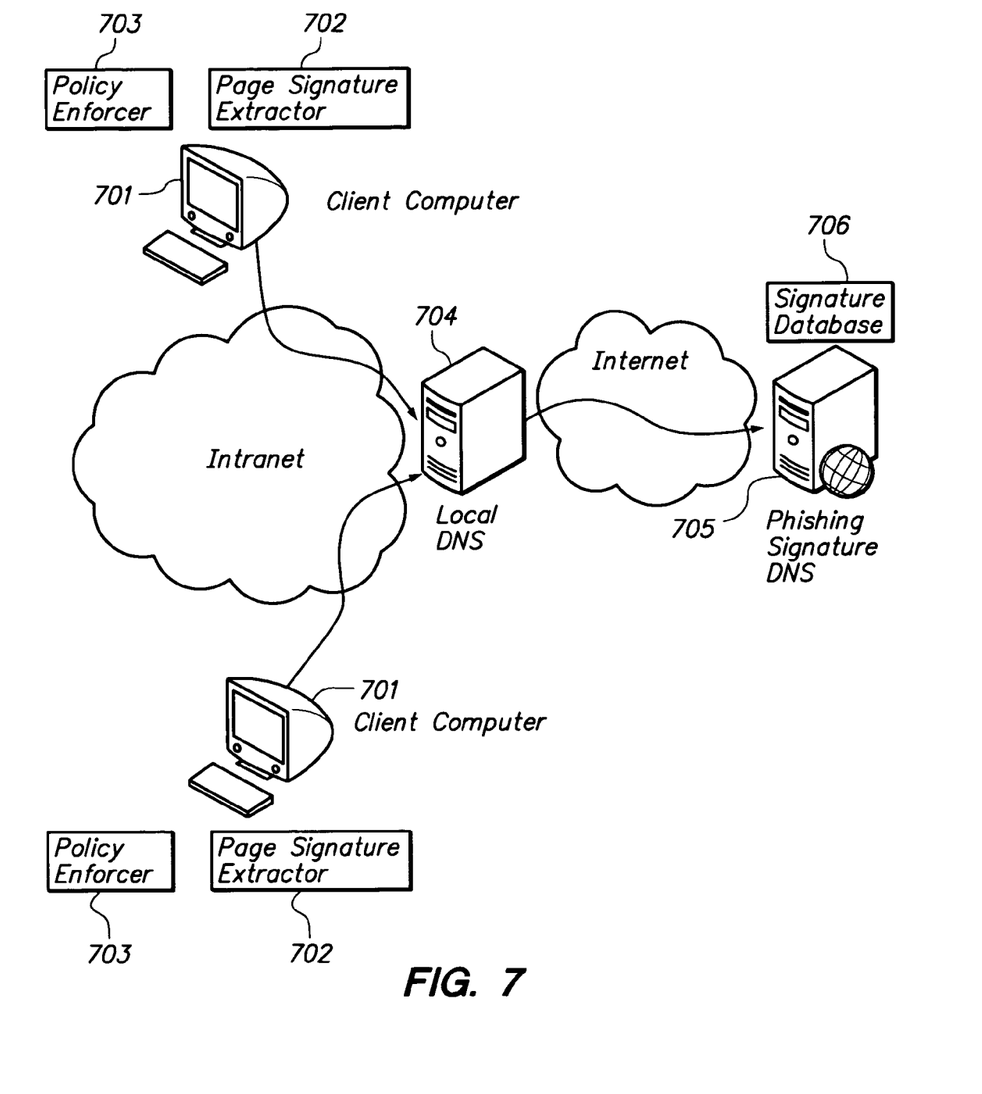
FIG. 7 schematically illustrates a system for protecting computer users from online frauds in accordance with an embodiment of the present invention.

FIG. 7 schematically illustrates a system for protecting computer users from online frauds in accordance with an embodiment of the present invention. The system may include one or more client computers 701 and one or more signature servers 705. Only one signature server 705 is shown in FIG. 7 for clarity of illustration.

The server 705 may comprise a server computer that maintains a database 706 of signatures of phishing pages. The phishing pages may be collected by antivirus or other computer security researchers from submissions by other collaborating researchers, honey pot computers, links to phishing pages included in phishing emails, and other means. For ease of comparison, each phishing page may be encoded into a signature. The signature may be obtained by taking a hash of the content of the phishing page. For example, to obtain the signature of a phishing page, the hash of the HTML code or "source" of the phishing page may be taken using the MD5 or SHA1 hash algorithm. The signatures of the phishing pages may be stored in the database 706 in the signature server 705. The signature server 705 may be configured to receive a web page signature from a client computer 701, compare the web page signature to signatures of phishing pages, and report the result of the comparison to the client computer 701.

In the example of FIG. 7, the signature server 705 is labeled as a "phishing signature DNS" because it is configured to communicate with the client computers 701 using the DNS protocol. That is, phishing detection requests from client computers 701 to the server 705 may be made in the form of a DNS query, while the corresponding response from the server 705 to the requesting client computer 701 may be in the form of a DNS answer. This is possible because the signature of a web page and the length of a phishing detection request and response allow for a relatively small, fixed length data that may be transmitted using the DNS protocol. In one embodiment, a phishing detection request sent by a client computer 701 to the server 705 to determine if a web page is a phishing page has the following format:

"<PageHashKey>.<Origin URL>.<AC Code>.anti-phish.trendmicro.com."

where "PageHashkey" is the signature of the web page, "Origin URL" is the URL of the web page, "AC Code" is a serial number, unique ID, or code that the server 705 may use to authenticate that the request is from the client computer 701, and "anti-phish.trendmicro.com" is the URL of the signature server 705, which in this example is operated by Trend Micro, Inc.

A phishing detection response sent by the server 705 to client computer 701 in response to the phishing detection request may have the following format:

"PhishResult=<yes/no>;Target=<ebay/paypal/citibank, etc.>;A=<SOASerialNumber>"

where "PhishResult=<yes/no>" indicates whether the signature of the web page matches that of a phishing page, "Target=<ebay/paypal/Citibank, etc.>" indicates the site potentially being faked by the phishing site, and "A=<SOASerialNumber>" is a serial number, unique ID, or code that the client 701 may use to authenticate that the response is from the server 705 (or other legitimate signature server), preventing the response from being replayed.

In the example of FIG. 7, a local DNS server 704 serves the client computers 701 on an Intranet. A client computer 701 may format a phishing detection request as a DNS query for the IP address of the server 705. The local DNS server 704 receives the DNS query and resolves the DNS query by passing it to the server 705, which is accessible to the client computer 701 over the Internet. The server 705 may also be located in the same private computer network as the client computers 701 or in some other location without detracting from the merits of the present invention. Locating the server 705 to be accessible over the Internet advantageously allows it to be used by different client computers 701 on different computer networks.

The signature server 705 receives the DNS query, authenticates that it is from a subscribing client computer 701 (e.g., by checking for its AC Code), and provides a phishing detection response in the form of a DNS answer, which is forwarded back to the client computer 701 in accordance with the DNS protocol.

Using the DNS protocol for communications between client computers 701 and signature servers 705 provide several advantages including a) use of an existing infrastructure on the Internet, b) distributed and scalable architecture, c) smaller packet than an HTTP query, d) completion of a request sequence in one packet (compared to about seven or more packets when using HTTP), e) fast response time, and f) leveraging local DNS cache to save bandwidth and server loading of the security vendor's data center. The use of the DNS protocol in conjunction with page signature based detection thus provides a practical, highly efficient, and fast phishing detection scheme unrealized in the prior art.

In the example of FIG. 7, a client computer 701 includes a page signature extractor 702 and a policy enforcer 703. A page signature extractor 702 may comprise computer-readable program code for receiving a web page, encoding the web page by generating its signature, communicating with the signature server 705 to determine if the web page's signature matches that of a phishing page, and alerting the policy enforcer when the signature of the web page matches that of a phishing page. In one embodiment, the page signature extractor 702 generates a web page signature using the same algorithm used to generate the signatures of phishing pages stored in the signature server 705. For example, both the page signature extractor 702 and the server 705 may generate a signature of a web page, which is a phishing page in the case of the server 705, by taking the hash of the web page's HTML code using the MD5 or SHA1 hash algorithm. Other ways of encoding web pages may also be used to generate signatures without detracting from the merits of the present invention. The encoding means is preferably not reversible for security purposes.

Figure 8:
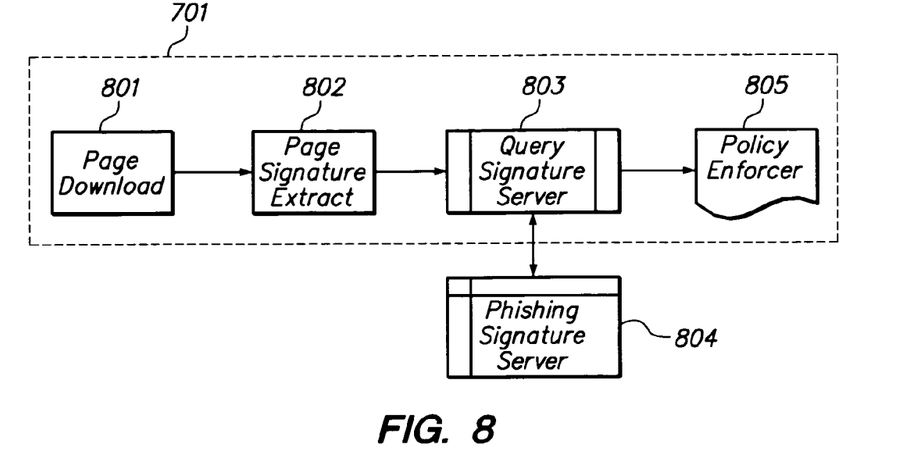
FIG. 8 schematically shows a flow diagram schematically illustrating the operation of a page signature extractor in a client computer in accordance with an embodiment of the present invention.

FIG. 8 schematically shows a flow diagram schematically illustrating the operation of a page signature extractor 702 in a client computer 701 in accordance with an embodiment of the present invention. In the example of FIG. 8, the page signature extractor 702 receives a web page downloaded in the client computer 701 (block 801), such as during user web browsing. The page signature extractor 702 receives the web page and generates a signature of the web page (block 802). The page signature extractor 702 sends the signature of the web page to the signature server 705 (block 803) to determine if the signature matches that of a phishing page. The signature server 705 compares the signature of the web page to signatures of phishing pages (block 804) and returns the result of the comparison to the page signature extractor 702. If there is a match between the signature of the web page and that of a phishing page, the page signature extractor 702 provides the URL of the web page and the result of the comparison to the policy enforcer 703. As will be more apparent below, the policy enforcer 703 may determine whether the web page is part of a pharming or phishing attack and perform a predetermined action (block 805).

The policy enforcer 703 may comprise computer-readable program code for performing an action in response to detection of a phishing or pharming attack and determining whether the attack is phishing or pharming. Being able to distinguish phishing from pharming facilitates root cause analysis and selection of the most appropriate corrective action.

Figure 9:
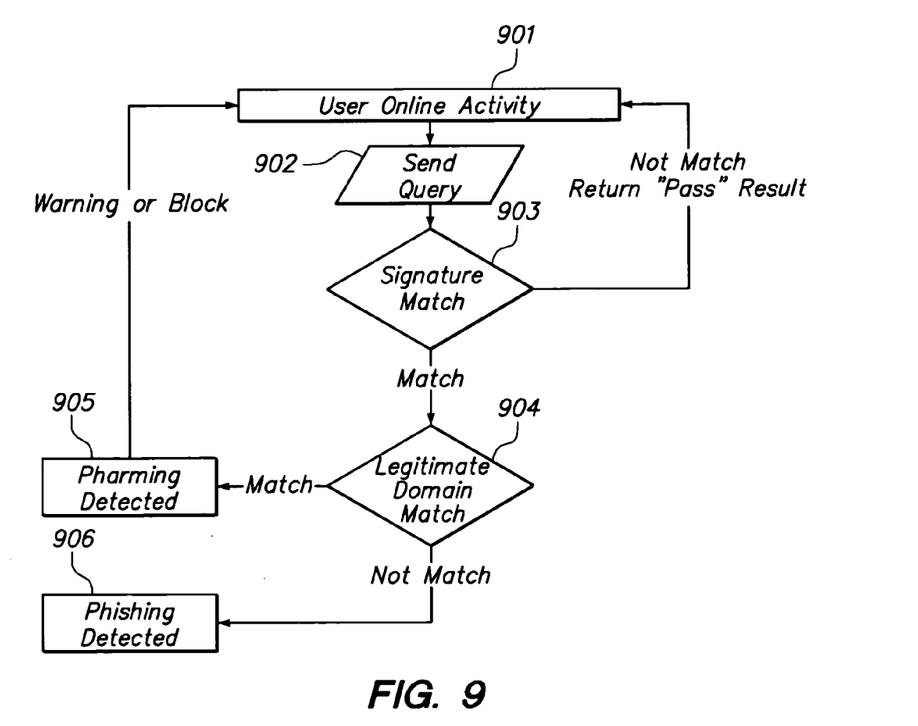
FIG. 9 shows a flow diagram illustrating the operation of a policy enforcer in conjunction with a page signature extractor in a client computer in accordance with an embodiment of the present invention.

FIG. 9 shows a flow diagram illustrating the operation of a policy enforcer 703 in conjunction with a page signature extractor 702 in a client computer 701 in accordance with an embodiment of the present invention. A user on a client computer 701 may be performing an online activity, such as web browsing or reading emails with hyperlinks (block 901). In response to receiving a web page in the client computer 701, the page signature extractor 702 queries a signature server 705 whether the signature of the web page matches that of a phishing page (block 902). If there is no signature match (block 903 to block 901), the user is allowed to view the web page and continue his online activity. Otherwise, if there is a signature match (block 903 to block 904), the page signature extractor 702 so informs the policy enforcer 703 and provides the URL of the web page to the policy enforcer 703.

The policy enforcer 703 compares the URL of the web page to those of legitimate websites. If the URL of the web page matches that of a legitimate website (block 904 to block 905), the policy enforcer 703 deems the attack to be a pharming attack. This is because a phishing page from a legitimate URL is most likely the result of a compromised DNS server. On the other hand, if the URL of the web page does not match a URL of a legitimate website (block 904 to block 906), the policy enforcer 703 deems that attack to be just a phishing attack, which is a situation when the web page falsely mimics a legitimate web page without using that legitimate web page's actual URL.

Figure 10:
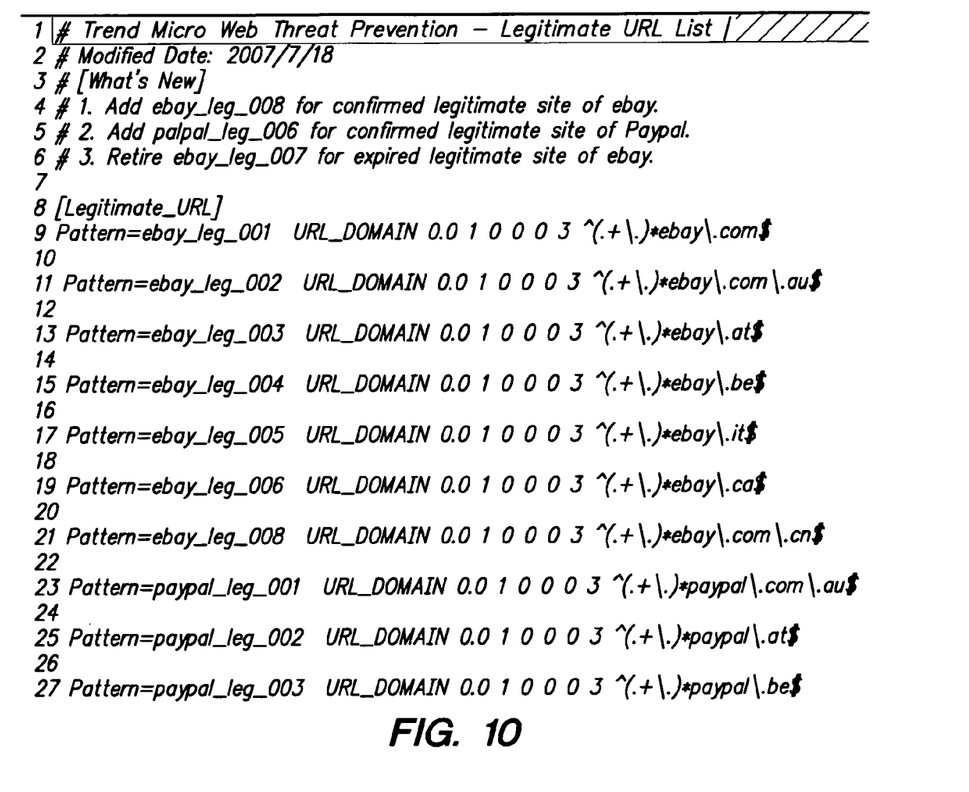
FIG. 10 shows example regular expressions for comparing URLs in accordance with an embodiment of the present invention.

The policy enforcer 703 may be configured to determine whether a URL belongs to a legitimate website using a regular expression matching algorithm. As is well known, a regular expression is a string that may be used to describe or match a set of strings according to syntax rules. Regular expressions for matching URLs of legitimate websites may be stored in the client computer 701 or an external computer accessible by the policy enforcer 703. FIG. 10 shows example regular expressions for comparing URLs in accordance with an embodiment of the present invention. The regular expressions allow for lookup of legitimate URLs, which in the example of FIG. 10 include those of the eBay® site and PayPal® site.

Figure 11A:
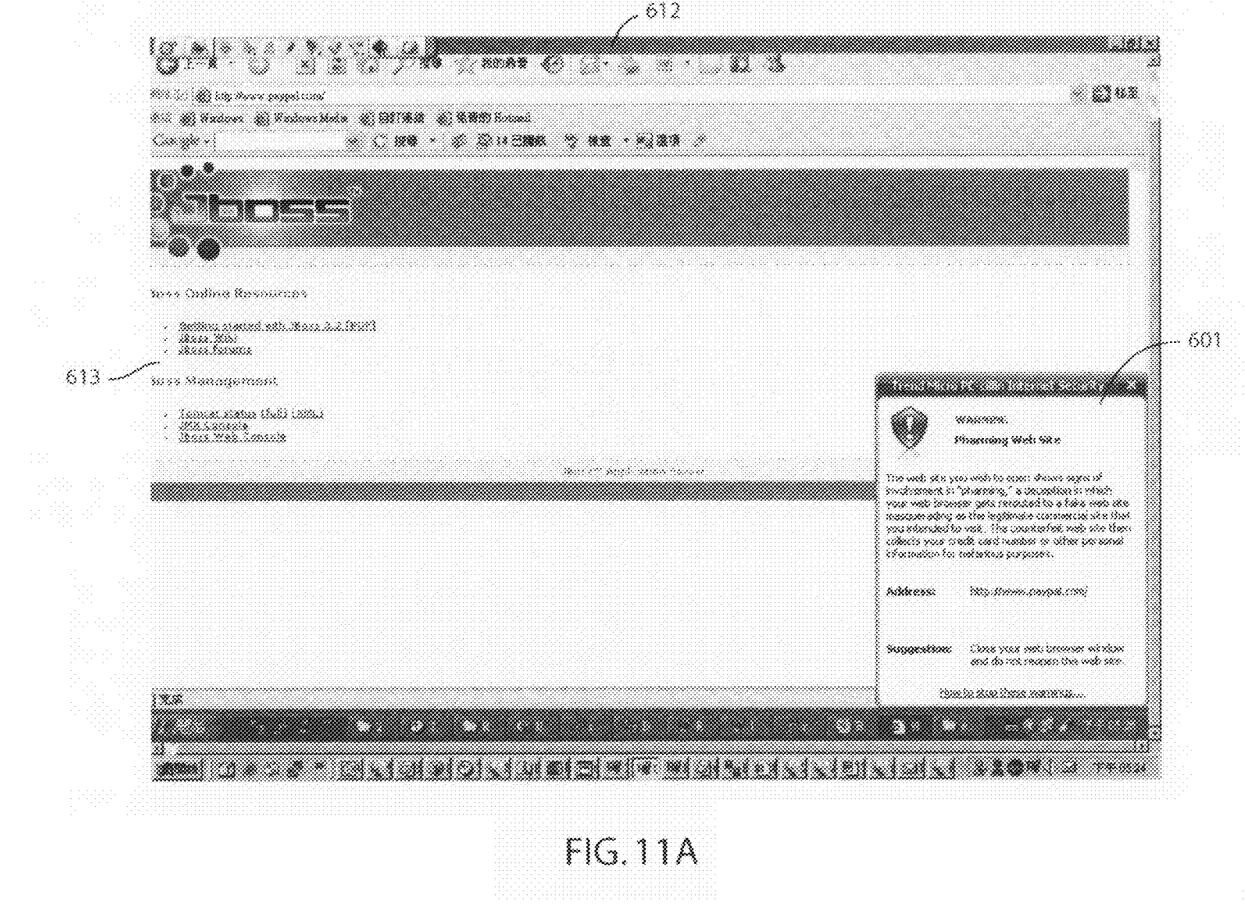
FIG. 11A shows an example warning message that may be displayed as a predetermined action responsive to detection of a pharming attack, in accordance with an embodiment of the present invention.
Figure 11B:
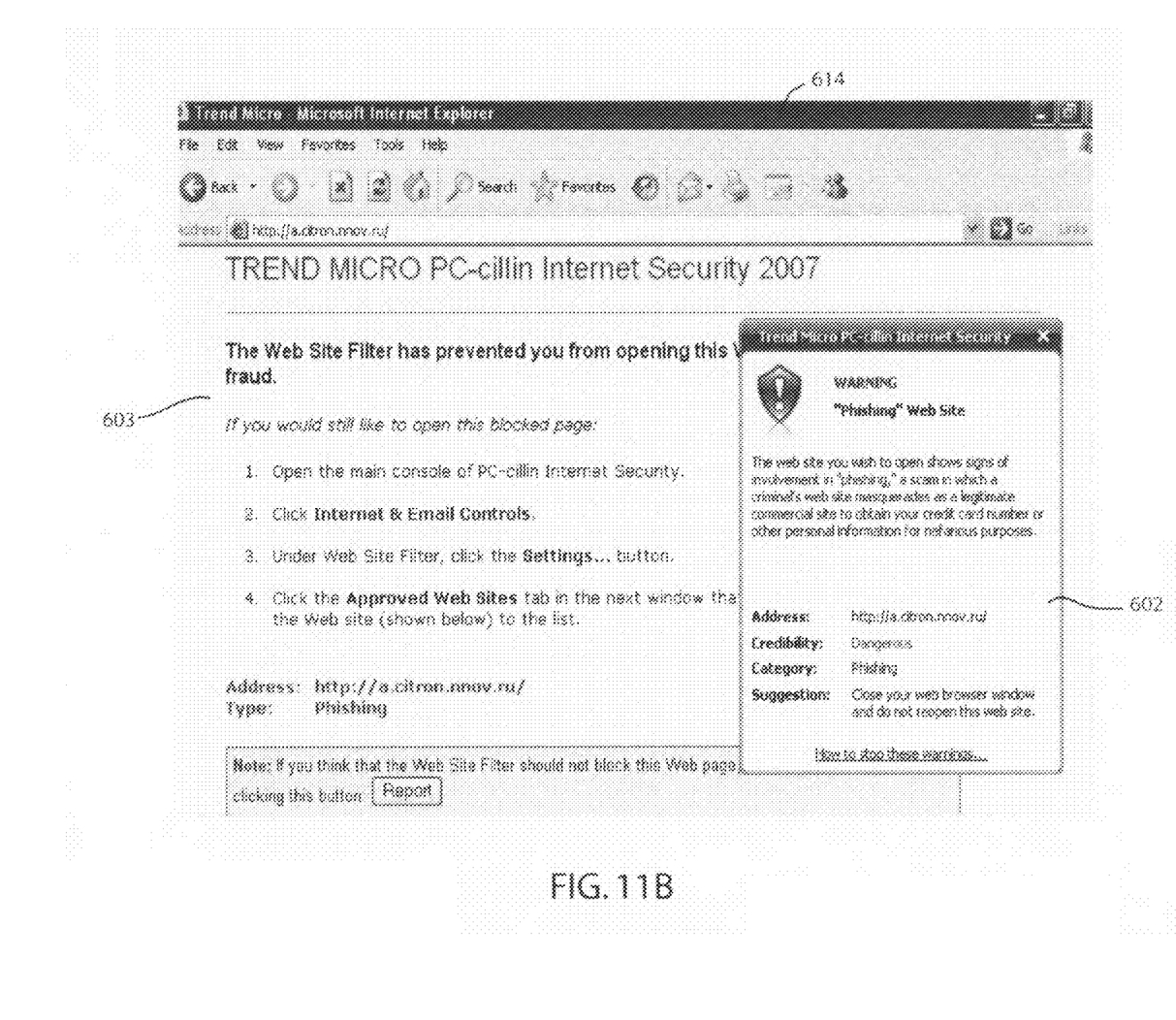
FIG. 11B shows an example warning message and blocking page displayed as a predetermined action responsive to detection of a phishing attack, in accordance with an embodiment of the present invention.

The policy enforcer 703 may perform predetermined actions in response to detection of signature match between a web page and a phishing page. In the case of detection of a pharming attack (page signature match with a legitimate URL; block 904 to block 905 of FIG. 9) or a phishing attack (page signature match without a legitimate URL; block 904 to 906 of FIG. 9), the policy enforcer 703 may be configured to block the web page and instead display a blocking page, display a warning message, or perform both. FIG. 11A shows an example where a pharming warning message 601 is displayed on top of a web browser 612 upon detection of a phishing page 613 having a URL of a legitimate website, which is the PayPal® site in this example. FIG. 11B shows an example where a phishing warning message 602 is displayed over a web browser 614 upon detection of a phishing page, which is not shown in this example as it has been blocked and replaced with a blocking page 603. The phishing page (not shown) in the example of FIG. 11B does not have a legitimate URL, indicating that it is not a result of pharming. The policy enforcer may be configured to replace a phishing page with a blocking page, post a warning message, or both depending on user settings.

Figure 12:
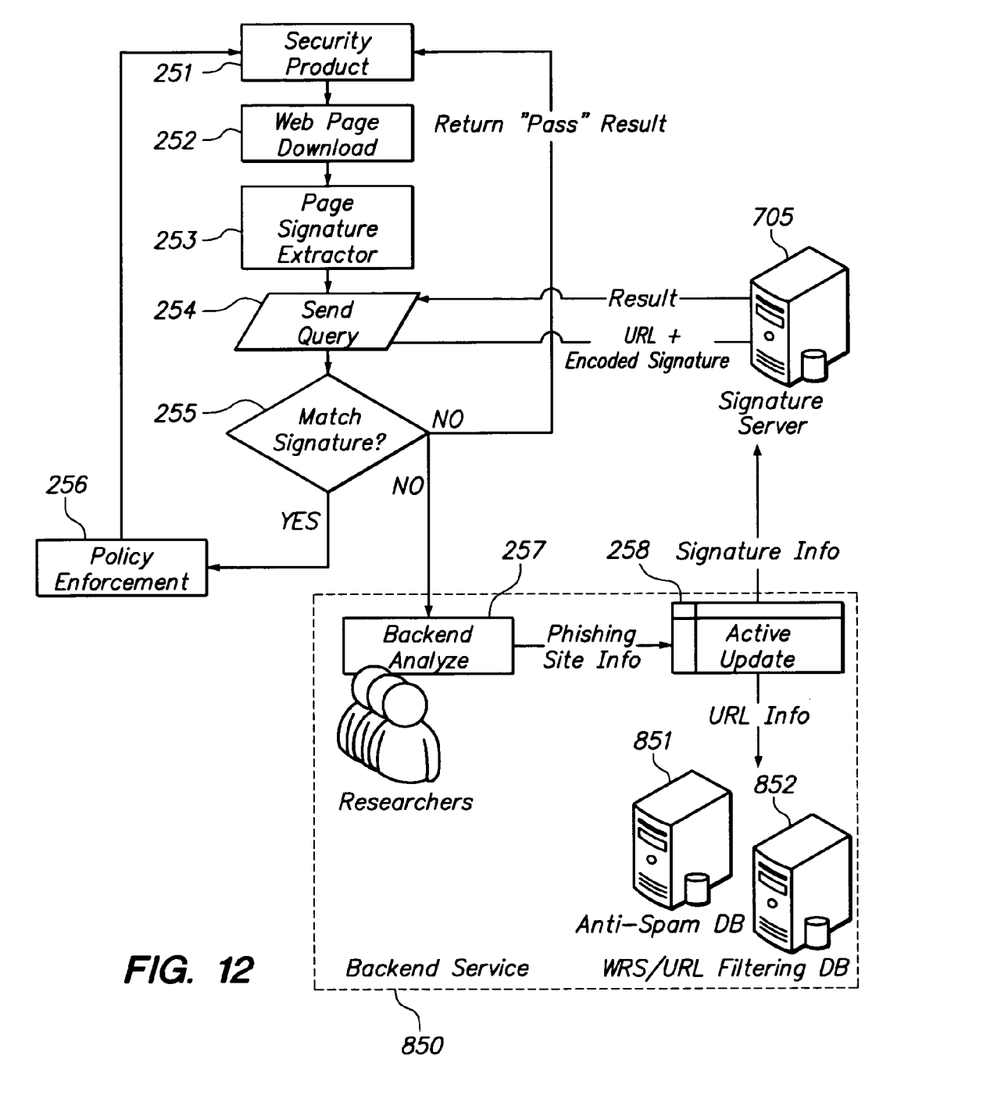
FIG. 12 shows a flow diagram schematically illustrating the operation of a system for protecting computer users from online frauds in accordance with an embodiment of the present invention.

FIG. 12 shows a flow diagram schematically illustrating the operation of a system for protecting computer users from online frauds in accordance with an embodiment of the present invention. FIG. 12 is explained using previously discussed components. As can be appreciated, other components may also be used without detracting from the merits of the present invention.

In the example of FIG. 12, a computer security product (block 251), such as an Internet security suite, runs in a client computer 701 and includes a page signature extractor 702 and a policy enforcer 703. When a web page is downloaded (block 252) to the client computer 701 for display on a web browser, the page signature extractor 702 receives the web page and encodes the web page by generating the signature of the web page (block 253). The page signature extractor 702 sends a phishing detection request to the signature server 705 to determine if the webpage is a phishing page (block 254). The phishing detection request may be in the form of a DNS query, and may include the signature and URL of the webpage for data collection and further investigation, if needed. In response to the phishing detection request, the signature server 705 compares the signature of the web page to signatures of phishing pages and returns the result of the comparison in the form of a DNS answer.

If the signature of the web page does not match that of a phishing page, the page signature extractor 702 allows the web page to be normally displayed on the web browser (block 255 to block 251; e.g., by simply passing the web page to the web browser). On the other hand, if the signature of the web page matches a signature of one or more phishing pages, the page signature extractor 702 so informs the policy enforcer 703 (block 255 to block 256). In that case, the policy enforcer 703 may determine if the web page is part of a phishing attack or pharming attack and perform a corresponding action in accordance with user configurable settings. For example, the policy enforcer 703 may replace the web page with a blocking page, display a warning message, or perform both depending on user settings.

The system of FIG. 12 may also be used to augment a backend service 850 for other computer security applications, such as anti-spam, web reputation service, and URL filtering. In the example of FIG. 12, the signature and URL of the web page may be provided to the backend service 850 for further analysis by researchers when there is no signature match (block 255 to block 257). The researchers may be those associated with the TrendLabs™ antivirus research center operated by Trend Micro, Inc., for example. Heuristic rules may be employed to automatically distinguish normal from suspicious web pages, with the suspicious web pages being analyzed manually by researchers. If the web page turns out to be a phishing page after further analysis, the URL of the web page along with its signature may be provided to the signature server 705, anti-spam server 851, and web reputation service/URL filtering server 852 to update their respective databases.

Embodiments of the present invention provide advantages heretofore unrealized. As can be appreciated, by not relying on a URL-level matching approach, the above embodiments can detect phishing pages even when the attacker moves the phishing page to a different URL. Studies made by the inventors suggest that although phishing URLs change and there is a relatively large number of phishing sites, phishing pages typically have the same or characteristic content. That is, the contents of phishing web pages tend to remain the same. For example, as shown in FIG. 13, the page content signature of a phishing page remains the same even when the same phishing URL is changed. Changing phishing pages would pose a huge administrative burden to attackers and, at a minimum, would slow down or reduce the number of phishing attacks. The above-described embodiments also remain effective even against Rock Phishing with its dynamically created phishing URLs. FIG. 14 shows the same phishing page signature for different, dynamically created URLs. The embodiments can detect a phishing page even with dynamically changing phishing URLs and URL signatures.

Improved methods and apparatus for protecting computer users from online frauds have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A computer-implemented method of protecting computer users from online frauds, the method comprising:
   generating a signature of a web page;
   preparing a DNS query containing the signature;
   sending the DNS query over a computer network;
   receiving the DNS query in a remote server computer over a computer network;
   determining in the server computer if the signature matches a signature of a phishing page for perpetrating online fraud;
   receiving a DNS answer responsive to the DNS query, the DNS answer indicating whether or not the signature matches that of a phishing page; and
   determining if a URL of the web page is of a legitimate website when the signature matches that of a phishing page as indicated in the DNS answer.

2. The method of claim 1 wherein the web page is deemed a phishing page when the URL of the web page does not belong to a legitimate website.

3. The method of claim 1 wherein the web page is deemed to be part of a pharming attack that compromised a DNS server when the URL of the web page matches that of a legitimate website.

4. The method of claim 1 further comprising:
   replacing the web page with a blocking page when the signature matches that of a phishing page.

5. The method of claim 1 further comprising:
   displaying a warning message when the signature matches that of a phishing page.

6. The method of claim 5 wherein the warning message warns a user of a pharming attack.

7. The method of claim 1 wherein the signature is obtained using a hash algorithm.

8. The method of claim 7 wherein the hash algorithm comprises the MD5 or SHA1 hash algorithm.

9. A computer-implemented method of protecting computer users from online frauds, the method comprising:
   generating a signature of a web page;
   determining if the signature matches that of a phishing page employed to perpetuate online fraud; and
   performing a predetermined action when the signature matches that of a phishing page,
   wherein the determining comprises providing the signature to a remote computer to compare the signature with signatures of phishing pages; and
   wherein the providing the signature comprises preparing a DNS query that includes the signature;
   receiving the DNS query in the remote server computer over a computer network; and
   receiving a DNS answer from the remote server computer, the DNS answer being responsive to the DNS query and including information indicating whether or not the signature matches that of a phishing page.

10. The method of claim 9 further comprising:
    determining if the web page is part of a pharming attack by comparing a URL of the web page to URLs of legitimate websites.

11. The method of claim 9 wherein the predetermined action comprises displaying a warning message.

* * * * *